United States Patent [19]

Braunhut

[11] 3,711,183

[45] Jan. 16, 1973

[54] AN OPTICAL TOY DEVICE FOR SIMULATING STEREOSCOPIC X-RAY IMAGES

[76] Inventor: Harold N. Braunhut, c/o Honney Toy Industries, 200 Fifth Avenue, New York, N.Y. 10010

[22] Filed: May 19, 1971

[21] Appl. No.: 144,818

[52] U.S. Cl. ............... 350/162 R, 350/157, 350/167
[51] Int. Cl. ............................................. G02b 5/18
[58] Field of Search ...... 350/157, 162 R, 167; 351/49

[56] References Cited

UNITED STATES PATENTS

| | | | |
|---|---|---|---|
| 839,016 | 12/1906 | MacDonald | 350/162 R |
| 3,530,010 | 9/1970 | Blakely | 350/162 R |
| 2,463,280 | 3/1949 | Kaehni et al. | 350/162 R |
| 1,354,471 | 10/1920 | Doner | 350/162 R |
| 2,232,551 | 2/1941 | Merton | 350/162 R |
| 2,731,872 | 1/1956 | Schwede | 351/49 |
| 2,985,866 | 5/1961 | Norton | 350/162 R |
| 914,904 | 3/1909 | Wiedenbeck | 350/162 R |
| 2,527,332 | 10/1950 | Raizen | 350/162 R |
| 3,544,196 | 12/1970 | Robba | 350/157 |
| 3,095,475 | 6/1963 | Brake | 350/162 R |

*Primary Examiner*—David Schonberg
*Assistant Examiner*—Paul R. Miller
*Attorney*—Friedman & Goodman

[57] ABSTRACT

An optical device comprising a generally transparent body for intercepting light emitted from an object and through which the object may be viewed. The light-transmissive body includes opposite surfaces on at least one of which is provided a plurality of transversely contiguously generally parallel grooves for operating upon light emitted from the object being viewed and simulating an X-ray image of the latter object.

7 Claims, 4 Drawing Figures

PATENTED JAN 16 1973

3,711,183

HAROLD N. BRAUNHUT
INVENTOR

BY
ATTORNEYS

3,711,183

AN OPTICAL TOY DEVICE FOR SIMULATING STEREOSCOPIC X-RAY IMAGES

BACKGROUND OF THE INVENTION

The present invention relates generally to optical devices and more particularly to an optical device which simulates an X-ray image of a particular object whether the object be viewed through the device or photographed through the intermediary of the device.

Devices for simulating X-ray images are well known and generally include a plurality of adjoining members intermediate of which is provided a feather or the like. The conventional arrangement is complex, inefficient and often difficult to effectively assemble and, therefore, is less than most desirable.

Another difficulty or disadvantage associated with the conventional optical device which simulates an X-ray image of an object is that the degree of visual clarity associated therewith cannot be most effectively controlled, this being predicated upon the fact that the use of a feather as interposed between two transparent bodies affords little means for varying the structural relationship of the various components so as to achieve X-ray image simulation which is most pronounced. In this respect, a feather cannot be altered readily in that the spacing or grooves inherent in a feather are related to one another in fixed dimension and in a generally fixed and unalterable manner. Thus, the employment of a feather by nature delimits the extent of control thereover.

SUMMARY OF THE INVENTION

Accordingly, it is an object of the present invention to provide an optical device which simulates an X-ray image of an object.

It is another object of the present invention to provide an optical device which is constituted generally of a single transparent or light-transmissive material which is integrally provided with means for simulating an X-ray image of an object which may be viewed therethrough.

It is still a further object of the present invention to provide an optical device which is generally light-transmissive and includes a surface having a plurality of grooves extending in a well defined parallel array and in a well defined configuration, which grooves operate upon light emitted from an object for simulating an X-ray image of an object being viewed.

It is another object of the present invention to provide a pair of optical lenses that may be placed into an eyeglass frame in a preferred orientation relative to one another to provide a steroscopic effect and operate upon light emmitted from an object being viewed through the lenses so as to simulate an X-ray image of the object being viewed.

It is still a further object of the present invention to provide a camera attachment in which is mounted a lens having grooves extending along the opposite surfaces thereof in a preferred orientation relative to one another, which camera attachment may be positioned upon a conventional camera lens so that an X-ray image of an object being photographed may be photographically simulated.

BRIEF DESCRIPTION OF THE DRAWINGS

With the above and additional objects and advantages in view as will hereinafter appear, this invention comprises the devices, combinations, and arrangements of parts hereinafter described and illustrated in the accompanying drawings of a preferred embodiment in which:

FIG. 4 illustrates a perspective view of the operative association of a camera attachment, in which is provided a lens pursuant to the principles of the present invention, and a conventional camera.

DETAILED DESCRIPTION OF THE INVENTION

Figure 1:
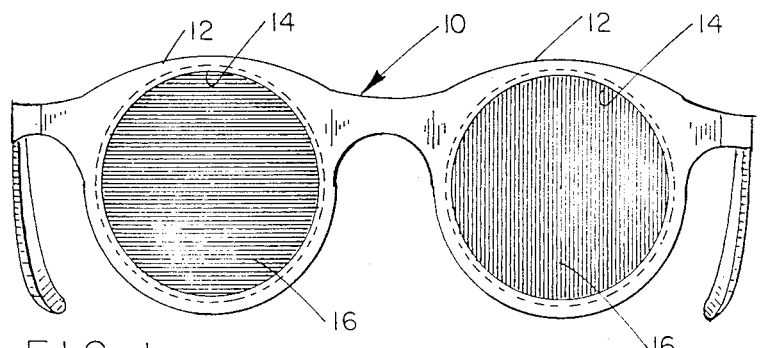
FIG. 1 illustrates a front elevational view of an eyeglass frame in which is mounted a pair of lenses pursuant to the principles of the present invention.

Referring now to the drawing and more particularly to FIG. 1 thereof, there is illustrated an eyeglass frame generally denoted by the reference character 10, which eyeglass frame 10 includes a pair of eyepieces 12 respectively having lens openings 14, each lens opening 14 having a lens 16 provided therein. Each lens 16 is generally constituted of thermoplastic such as polystyrene or the like in the preferred embodiment, however, most dimensionally stable transparent materials which may be molded with fine impressions may be utilized equally as well.

Figure 2:
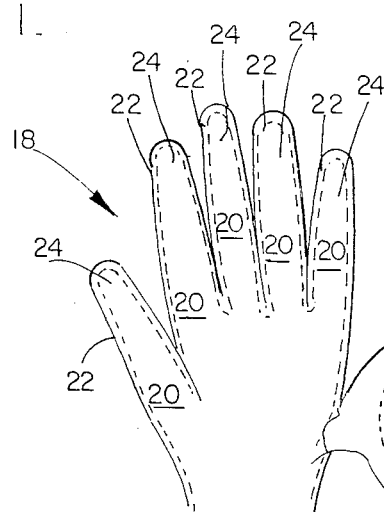
FIG. 2 illustrates a diagramatic view of an X-ray image of a hand as viewed by an eye through the intermediary of a fragment of the lens frame illustrated in FIG. 1.
Figure 2:
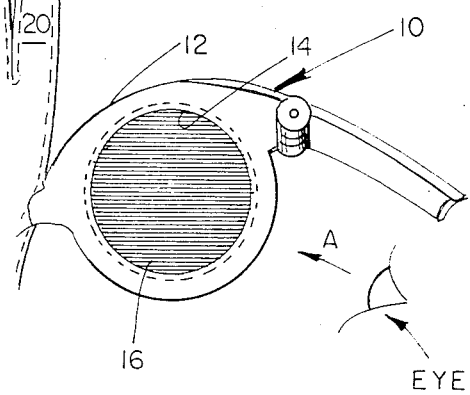

As will be discussed further below, each of the lenses 16 is provided with a plurality of grooves which extend in a preferred orientation relative to one another, and when an object is viewed therethrough, there is simulated an X-ray image of the object. In this respect, in FIG. 2, there is illustrated an X-ray image of a hand 18 having fingers 20. The X-ray image 18 is defined by an outer lighter area 22 which generally simulates the flesh of the hand, whereas the darker inner area 24 of the image 18 generally simulates the bone structure of the hand.

Figure 3:
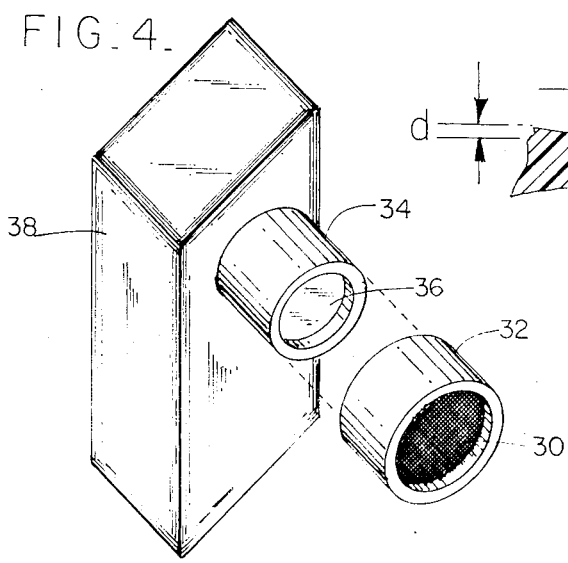
FIG. 3 illustrates a cross-sectional view of a fragment of one lens pursuant to the present invention and illustratively exaggerates the relationship of the grooves as provided in the lens.
Figure 3:
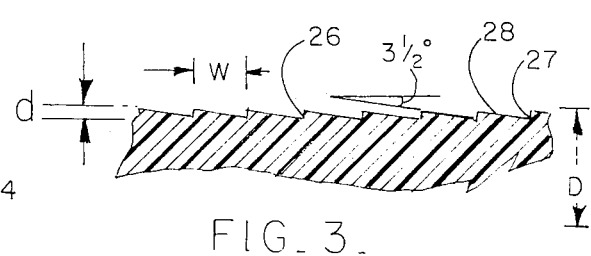

Each lens 16 is provided with a pair of opposite surfaces, on at least one of these surfaces there being provided a plurality of grooves which extend generally in a parallel array. As illustrated in FIG. 3, the grooves 26 extend in contiguous relation, that is each of two adjoining grooves include respective walls, a vertical wall 27 which extends generally transversely of the plane defined by the surface in which the grooves are formed, and an inclined wall 28 which extends in the instance of the preferred embodiment at an acute angle of substantially 3 ½ degrees with the plane defined by the surface in which the grooves are formed, the vertical wall 27 and the inclined wall 28 of adjacent grooves extending in intersecting relation.

It has been determined that the acute angle of 3 ½ degrees defined by the inclined wall 28 with the plane defined by the surface in which the grooves are formed constitutes an optimum angle in that an object may be viewed through the lens over a range varying from two feet to infinity. It has also been determined that although other acute angles such as 5° may be utilized, there is a loss of character definition of the object being viewed after a distance of approximately 6 feet. Thus, in order to provide a lens that may be used generally universally over any distance, it is best, as in the case of the instant embodiment, to form each of the grooves 26 such that the inclined wall 28 defines an acute angle of substantially 3 ½ degrees with the plane defined by the surface in which the grooves 26 are formed.

In the preferred embodiment, the grooves 26 are formed generally in a mold, the latter operated upon earlier by means of a diamond tip tool for accurately forming the proper grooves in the mold. The grooves 26 are provided with a depth $d$ of approximately 0.0001 inches and a width W of approximately 0.002 inches. The thickness D of the lenses 16 is approximately 0.06 inches.

As indicated above, the grooves 26 may be provided on one surface of the lens 16 and an object when viewed through the lens 16 will appear as a simulated X-ray image. However, it has been determined that if only one surface of the lense 16 is provided with the grooves 26 therein, X-ray simulation is limited to approximately 180° or substantially one half of the object being viewed. Thus, in order to enhance the extent of X-ray simulation, it is necessary to provide, as in the case of one embodiment pursuant to the present invention, a second lens 16 in which is also provided the plurality of grooves 26, however, when the lenses 16 are disposed into the eyeglass frame 10, the grooves 26 in the respective lenses 16 should extend in mutually perpendicular relation or generally transversely of one another. In this respect, the two lenses 16 provide a sterescopic effect which acts to combine the separate images viewed by the eyes of the observer through the eyeglass frames 10 and thereby provide X-ray simulation over a full 360° of the object being viewed.

In another embodiment pursuant to the present invention, it is equally feasible to provide grooves 26 on each of the opposite sides of the lens 16, however, the grooves 26 on one surface of the lens 16 should extend generally transversely of the other grooves 26 provided on the opposite surface of the lens 16. Thus, the single lens acts to provide a sterescopic effect and, therefore, enhance X-ray simulation over a full 360° of the object being viewed.

In the instance of the second embodiment where each of the opposite faces of the lens 16 is provided with the grooves 26 which extend in mutually perpendicular relation relative to one another, the latter lens generally denoted by the reference character 30 in FIG. 4, may be mounted internally of a cylindrical frame 32 and together constitute an attachment for operative association with a conventional camera. In this respect, the lens-carrying cylinder 34, in which is provided a conventional camera lens 36 operatively associated with a conventional camera 38, is adapted for receiving the cylindrical frame 32 in which is mounted the X-ray simulation lens 30 pursuant to the present invention. Thus, with the cylindrical frame 32 mounted upon the lens-carrying cylinder 34, the camera may be utilized for photographing an object and thereby supply or provide a photographic X-ray simulated image.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. An optical device comprising at least one lens of thermoplastic material, said lens being transparent, said lens including means to provide a stereoscopic effect for simulating an X-ray image of a particular object over a full 360° when viewed through said lens, said means including a first set of a plurality of grooves provided in a first surface of said lens and a second set of a plurality of grooves provided in an opposing second surface of said lens, said grooves of said first set extending in a generally parallel array and being transversely contiguous such that adjoining grooves of said first set include respective walls which extend in common intersecting relation, said grooves of said second set extending in a generally parallel array and being transversely contiguous such that adjoining grooves of said second set include respective walls which extend in common intersecting relation, one of said respective walls of each of said grooves of said first set extending generally transversely of a first plane defined by said first surface and the other of said respective walls of each of said groove of said first set being inclined at a first acute angle relative to said first plane, one of said respective walls of each of said grooves of said second set extending generally transversely of a second plane defined by said second surface and the other of said respective walls of each of said grooves of said second set being inclined at a second acute angle relative to said second plane, said first and second acute angles being less than 5°, said grooves of said first set extending generally transversely of said grooves of said second set.

2. An optical device as claimed in claim 1, wherein said first and second acute angles are substantially 3 ½ degrees.

3. An optical device as claimed in claim 1, wherein said thermoplastic material is polystyrene.

4. An optical device as claimed in claim 1, wherein said lens is mounted on a cylindrical frame for fitting over a lens holder of a camera.

5. An eyeglass frame comprising a pair of eyepieces, each of said eyepieces being provided with a lens opening, a lens of thermoplastic material disposed in each lens opening, each lens being transparent, said lenses including means to provide a stereoscopic effect for simulating an X-ray image of a particular object over a full 360° when viewed through said lenses, said means including a plurality of grooves provided in a surface of each of said lenses, said grooves in each of said lenses extending in a generally parallel array and being transversely contiguous such that adjoining grooves in each of said lenses include first and second respective walls which extend in common intersecting relation, said first respective wall extending generally transversely of a plane defined by said surface of each of said lenses and said second respective wall being inclined at an acute angle relative to said plane, said acute angle being less than 5°, said grooves in one of said lenses extending generally transversely of said grooves in the other of said lenses so that said one lens simulates said X-ray image when the object is in a vertical position with said other lens simulating said X-ray image when the object is in a horizontal position.

6. An eyeglass frame as claimed in claim 5, wherein said acute angle is substantially 3 ½ degrees.

7. An eyeglass frame as claimed in claim 5, wherein said thermoplastic material is polystyrene.

* * * * *